(12) United States Patent
Dang et al.

(10) Patent No.: US 11,615,538 B2
(45) Date of Patent: *Mar. 28, 2023

(54) HEADING ANGLE ESTIMATION FOR OBJECT TRACKING

(71) Applicant: Aptiv Technologies Limited, St. Michael (BB)

(72) Inventors: Wenbing Dang, San Jose, CA (US); Jan K. Schiffmann, Newbury Park, CA (US); Kumar Vishwajeet, Pasadena, CA (US); Susan Chen, Los Angeles, CA (US)

(73) Assignee: Aptiv Technologies Limited, St. Michael (BB)

( * ) Notice: Subject to any disclaimer, the term of this patent is extended or adjusted under 35 U.S.C. 154(b) by 47 days.

This patent is subject to a terminal disclaimer.

(21) Appl. No.: 17/403,690

(22) Filed: Aug. 16, 2021

(65) Prior Publication Data

US 2021/0374974 A1 Dec. 2, 2021

Related U.S. Application Data

(63) Continuation of application No. 16/398,745, filed on Apr. 30, 2019, now Pat. No. 11,113,824.

(51) Int. Cl.
*G06T 7/246* (2017.01)
*G06T 7/50* (2017.01)
*G06T 7/60* (2017.01)

(52) U.S. Cl.
CPC ............... *G06T 7/246* (2017.01); *G06T 7/50* (2017.01); *G06T 7/60* (2013.01)

(58) Field of Classification Search
CPC ..... G08G 1/166; G06V 20/588; G06V 10/571; B60W 40/04
See application file for complete search history.

(56) References Cited

U.S. PATENT DOCUMENTS

| | | | |
|---|---|---|---|
| 5,764,786 A * | 6/1998 | Kuwashima | ............... G06T 7/20 348/E5.042 |
| 6,202,027 B1 | 3/2001 | Alland et al. | |
| 6,278,937 B1 | 8/2001 | Ishida et al. | |
| 6,292,759 B1 | 9/2001 | Schiffmann | |
| 6,597,984 B2 * | 7/2003 | Appenrodt | ............. G01C 21/30 701/514 |
| 6,615,138 B1 | 9/2003 | Schiffmann | |
| 6,891,563 B2 | 5/2005 | Schofield et al. | |
| 6,898,527 B2 | 5/2005 | Kimura et al. | |
| 7,024,286 B2 | 4/2006 | Kimura et al. | |
| 7,057,500 B1 | 6/2006 | Belloso | |

(Continued)

OTHER PUBLICATIONS

"Foreign Office Action", EP Application No. 20166800.1, dated Aug. 31, 2022, 6 pages.

(Continued)

*Primary Examiner* — Yosef Kassa
(74) *Attorney, Agent, or Firm* — Sawtooth Patent Group PLLC

(57) ABSTRACT

An illustrative example method of tracking an object includes detecting one or more points on the object over time to obtain a plurality of detections, determining a position of each of the detections, determining a relationship between the determined positions, and determining an estimated heading angle of the object based on the relationship.

20 Claims, 3 Drawing Sheets

(56) References Cited

U.S. PATENT DOCUMENTS

| | | |
|---|---|---|
| 7,127,339 B2 | 10/2006 | Iwazaki et al. |
| 7,236,884 B2 | 6/2007 | Matsumoto et al. |
| 7,760,113 B2 | 7/2010 | Uhler |
| 7,778,753 B2 | 8/2010 | Fujiwara et al. |
| 7,792,622 B2 | 9/2010 | Wei et al. |
| 7,805,244 B2 | 9/2010 | Park |
| 7,859,652 B2 | 12/2010 | Uechi |
| 8,094,190 B2 | 1/2012 | Kubota et al. |
| 8,315,433 B2 | 11/2012 | Hsu et al. |
| 8,364,370 B2 | 1/2013 | Yonezawa et al. |
| 8,447,071 B2 | 5/2013 | Ohta |
| 8,477,997 B2 | 7/2013 | Tamura et al. |
| 8,606,539 B2 | 12/2013 | Takabayashi et al. |
| 8,930,060 B1 * | 1/2015 | Lu ............ B60K 28/14 701/25 |
| 8,972,095 B2 | 3/2015 | Furuno et al. |
| 9,014,903 B1 | 4/2015 | Zhu et al. |
| 9,102,269 B2 | 8/2015 | Waite et al. |
| 9,568,327 B2 * | 2/2017 | Park ............ G08G 1/166 |
| 9,651,386 B2 * | 5/2017 | Park ............ G01C 21/26 |
| 9,921,306 B1 | 3/2018 | Friesel |
| 11,113,824 B2 | 9/2021 | Dang et al. |
| 2004/0000991 A1 | 1/2004 | Schiffmann et al. |
| 2018/0068565 A1 | 3/2018 | Smith et al. |
| 2018/0095171 A1 | 4/2018 | Cuichun |
| 2019/0004166 A1 | 1/2019 | Orlowski et al. |
| 2020/0124716 A1 | 4/2020 | Millar et al. |
| 2020/0349718 A1 | 11/2020 | Dang et al. |
| 2021/0339750 A1 | 11/2021 | Szlachetka et al. |

OTHER PUBLICATIONS

"Extended European Search Report", EP Application No. 20172208.9, dated Oct. 12, 2020, 7 pages.

"Extended European Search Report", European Application No. 20166800, dated Sep. 28, 2020, 9 pages.

"Non-Final Office Action", U.S. Appl. No. 16/398,745, filed Jan. 21, 2021, 7 pages.

"Non-Final Office Action", U.S. Appl. No. 16/398,745, dated Sep. 29, 2020, 6 pages.

"Notice of Allowance", U.S. Appl. No. 16/398,745, dated May 3, 2021, 7 pages.

"Supplemental Notice of Allowance", U.S. Appl. No. 16/398,745, dated May 7, 2021, 2 pages.

Kellner, et al., "Tracking of Extended Objects with High Resolution Doppler Radar", Dec. 2015, 13 pages.

Liu, et al., "Robust Principal Axes Determination for Point-Based Shapes Using Least Median of Squares", Computer-Aided Design 41 (2009), 13 pages.

* cited by examiner

HEADING ANGLE ESTIMATION FOR OBJECT TRACKING

CROSS-REFERENCE TO RELATED APPLICATION

This application is a continuation of and claims priority to U.S. Non-Provisional patent application Ser. No. 16/398,745, filed Apr. 30, 2019, the disclosure of which is incorporated by reference in its entirety.

BACKGROUND

Various sensor types have proven useful for detecting objects nearby or in a pathway of a vehicle. Example sensor types include ultrasound, radio detection and ranging (RADAR) and light detection and ranging (LIDAR). The way in which such sensors are being used on passenger vehicles has been increasing.

One challenge associated with using such sensors for tracking objects is that the objects can have varying shapes and sizes, which impair the ability of a sensor to determine certain characteristics of the object such as the direction in which the object is heading. Known Kalman filters are designed to rapidly provide heading angle or direction information regarding a tracked object. While a Kalman filter estimate is often very useful, it is possible for the estimate to be inaccurate.

Kalman filters are designed to operate based on tracking movement of a single point. Since three-dimensional objects have multiple points that may be detected by a sensor, the Kalman filter can interpret detector information regarding multiple points as if it indicates movement of a single point. In other words, a Kalman filter is not capable of distinguishing between detection of multiple different points on an object and movement of a single point on that object. Given the possibility of interpreting different points on an object as if they were the same point, sensor information regarding those points can be mistaken for movement of a single point leading to inaccurate tracking information.

SUMMARY

An illustrative example method of tracking an object includes detecting one or more points on the object over time to obtain a plurality of detections, determining a position of each of the detections, determining a relationship between the determined positions, and determining an estimated heading angle of the object based on the relationship.

In an example embodiment having one or more features of the method of the previous paragraph, determining the spatial relationship comprises defining a shape that encompasses the determined positions and determining the estimated heading angle of the object comprises determining an orientation of the defined shape.

In an example embodiment having one or more features of the method of any of the previous paragraphs, the defined shape is at least one of an arc, a line and a rectangle.

In an example embodiment having one or more features of the method of any of the previous paragraphs, determining the estimated heading angle is based on the determined orientation and range rate information regarding at least some of the detections.

An example embodiment having one or more features of the method of any of the previous paragraphs includes detecting the one or more points at least until a distance spanned by the determined positions exceeds a preselected threshold distance.

An example embodiment having one or more features of the method of any of the previous paragraphs includes using the determined estimated heading angle to correct a previously estimated heading angle of the object.

In an example embodiment having one or more features of the method of any of the previous paragraphs, the previously estimated heading angle of the object is determined by a Kalman filter.

In an example embodiment having one or more features of the method of any of the previous paragraphs, determining the estimated heading angle comprises using: a likelihood estimation, a least squares estimation, a principle components analysis, or a Hough transform.

An illustrative example device for tracking an object includes a detector that detects one or more points on the object over time and a processor that is configured to determine a position of each of the detected one or more points, determine a spatial relationship between the determined positions, and determine an estimated heading angle of the object based on the relationship.

In an example embodiment having one or more features of the device of the previous paragraph, the processor is configured to determine the spatial relationship by defining a shape that encompasses the determined positions and determine the estimated heading angle of the object by determining an orientation of the defined shape.

In an example embodiment having one or more features of the device of any of the previous paragraphs, the defined shape is at least one of an arc, a line and a rectangle.

In an example embodiment having one or more features of the device of any of the previous paragraphs, the processor is configured to determine the estimated heading angle based on the determined orientation and range rate information regarding at least some of the detected one or more points.

In an example embodiment having one or more features of the device of any of the previous paragraphs, a distance spanned by the determined positions exceeds a preselected threshold distance.

An example embodiment having one or more features of the device of any of the previous paragraphs includes a Kalman filter that determines an initial estimated heading angle of the object and the processor is configured to provide the determined estimated heading angle to the Kalman filter to correct the initial estimated heading angle of the object.

In an example embodiment having one or more features of the device of any of the previous paragraphs, the processor is configured to determine the estimated heading angle using: a likelihood estimation, a least squares estimation, a principle components analysis, or a Hough transform.

An illustrative example device for tracking an object includes detection means for detecting one or more points on the object over time and determining means for determining a position of each of the detected one or more points, determining a spatial relationship between the determined positions, and determining an estimated heading angle of the object based on the relationship.

In an example embodiment having one or more features of the device of the previous paragraph, the spatial relationship defines a shape that encompasses the determined positions and the determining means determines the estimated heading angle of the object by determining an orientation of the defined shape.

In an example embodiment having one or more features of the device of any of the previous paragraphs, the defined shape is at least one of an arc, a line and a rectangle.

In an example embodiment having one or more features of the device of any of the previous paragraphs, the determining means determines the estimated heading angle based on the determined orientation and range rate information regarding at least some of the detected one or more points.

In an example embodiment having one or more features of the device of any of the previous paragraphs, a distance spanned by the determined positions exceeds a preselected threshold distance.

The various features and advantages of at least one disclosed example embodiment will become apparent to those skilled in the art from the following detailed description. The drawings that accompany the detailed description can be briefly described as follows.

DETAILED DESCRIPTION

Figure 1:
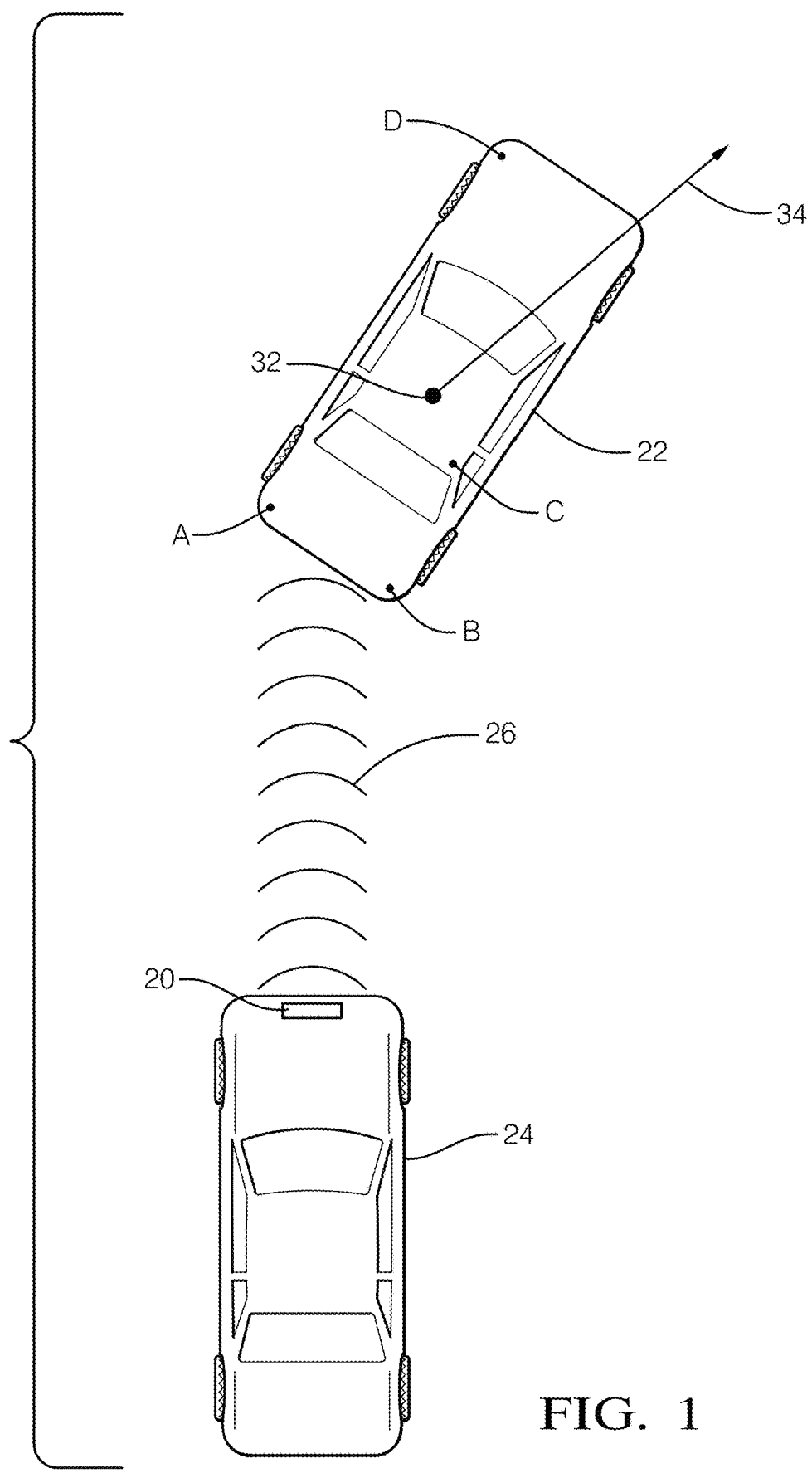
FIG. 1 diagrammatically illustrates an example use of a device for tracking an object.

FIG. 1 diagrammatically illustrates a device 20 for tracking a moving object 22. In this example, the device 20 is situated on a vehicle 24. For discussion purposes, the moving object 22 is another vehicle located ahead of the vehicle 24 and at least partially in a pathway of the vehicle 24. The device 20 uses RADAR signaling as schematically shown at 26 for tracking the vehicle 22.

As schematically shown in FIG. 1, the vehicle 22 includes a centroid 32. The vehicle 22 is traveling along a curved trajectory, such as turning (to the right according to the drawing). Under such conditions, a velocity vector of the centroid 32 of the vehicle 22 is situated at a heading angle 34 under the conditions shown in FIG. 1. The coordinate system in which the heading angle 34 is determined may be based upon a world coordinate system. Alternatively, the coordinate system may be fixed relative to the vehicle 24 or the device 20.

In this document, the pointing angle refers to the body orientation angle of a moving object, such as the vehicle 22, that is being tracked by the device 20. The body orientation angle or the pointing angle is the azimuth direction that the moving body's centerline or longitudinal axis is pointing.

In this document, the heading angle is the direction of motion of a particular reference point on the moving object, such as the vehicle 22. It is worth noting that in some contexts, such as aviation, the term "heading angle" is used to refer to that which is called the "pointing angle" in this document. Also, in aviation contexts, the term "track" is used to refer to that which is called the "heading angle" in this document.

Figure 2:
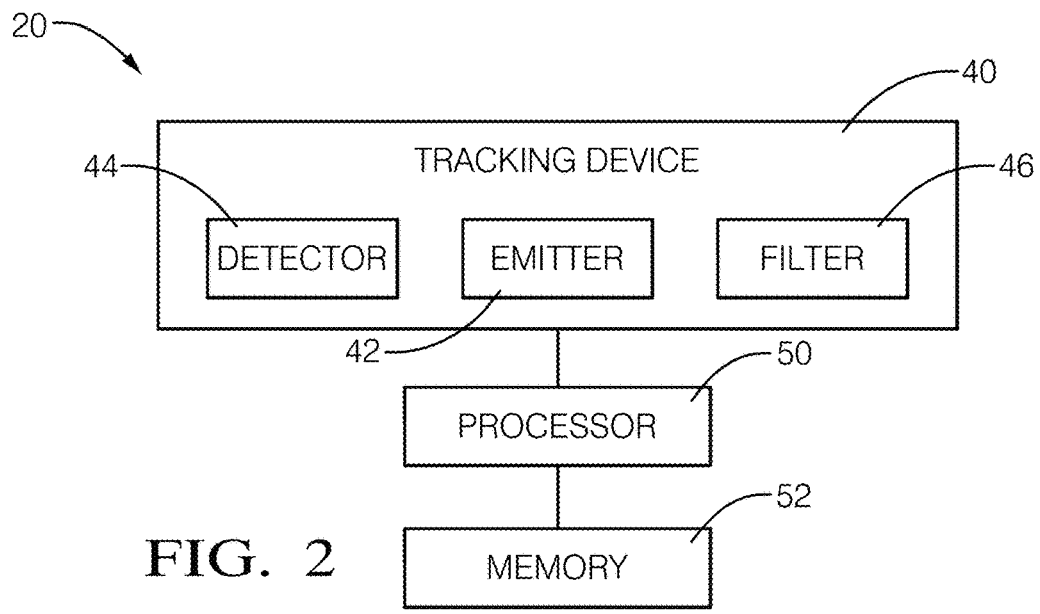
FIG. 2 schematically illustrates selected portions of an example object tracking device.

FIG. 2 schematically illustrates selected portions of the device 20 including an emitter 42 and detector 44. The emitter 42 emits radiation in an outward direction and, when such radiation reflects off of an object, that reflected radiation is received and detected by the detector 44. In some example embodiments, the emitter 42 and detector 44 operate according to known RADAR principles and techniques. Other embodiments include emitter and detector configurations that are useful for LIDAR or ultrasonic detection techniques.

The device 20 includes a filter 46 that is configured for estimating dynamic quantities of a tracked object such as the position, velocity, acceleration, and trajectory curvature of that object. In some example embodiments, the filter 46 operates according to known principles of Kalman filters. The filter 46 in this example provides information that indicates the heading angle of at least one reference point on the moving object 22. For example, the filter 46 provides information indicating the heading angle 34 of the centroid 32 of the vehicle 22.

The filter 46 is capable of providing information regarding the heading angle of the centroid of a moving object, however, the filter 46 is not capable of distinguishing between multiple detected points on the object or vehicle 22. For example, in FIG. 1, the detector 44 may receive reflected radiation from a plurality of points A, B, C, D in various locations on the vehicle 22. The filter 46 is not able to distinguish between information regarding those detected points A-D and information regarding a single point that is detected multiple times. In other words, the filter 46 will interpret the information, such as the range rate, regarding the points A-D as if that information indicated movement of a single point rather than indicating multiple, different points. When the filter 46 operates as a Kalman filter, it treats all detected point information as if it pertains to a single point.

The device 20 includes a processor 50, which may be a dedicated microprocessor or a portion of another computing device supported on the vehicle 24. In this embodiment, the processor 50 is configured for determining an estimated heading angle based on position information regarding one or more detected points A-D on the object 22 over time.

Memory 52 is associated with the processor 50. In some example embodiments, the memory 52 includes computer-executable instructions that cause the processor 50 to operate for purposes of tracking a moving object and determining the pointing angle or body orientation angle of that object. In some example embodiments, the memory 52 at least temporarily contains information regarding various features or characteristics of detected points on the tracked object 22 to facilitate the processor 50 making desired determinations regarding the position or movement of such an object.

Example embodiments of this invention allow for more accurately determining the heading angle of a moving object, such as the vehicle 22. This feature is particularly useful at the beginning of a tracking session when the filter 46 has relatively limited information for determining the heading angle. With the processor 50 providing a heading angle estimate to the filter 46 object tracking is improved. Embodiments of this invention, therefore, provide an improvement in tracking technology and improvements in vehicle control based on information regarding moving objects in a vicinity or pathway of a vehicle.

In some embodiments, the filter 46 operates to provide an indication of the presence of an object even though the heading angle is not yet defined. This approach allows for early object detection and subsequent determination or refinement of the heading angle.

Figure 3:
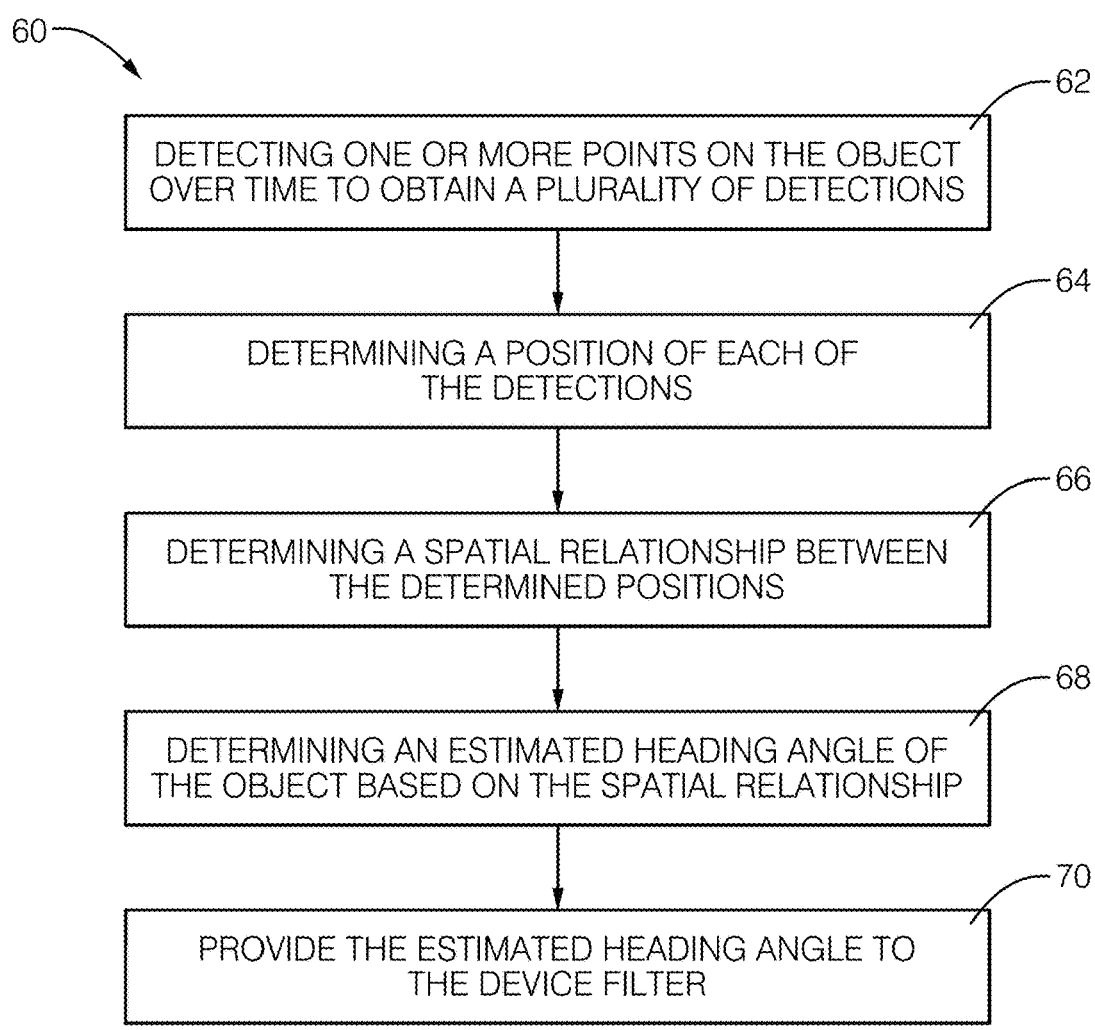
FIG. 3 is a flowchart diagram summarizing an example method of tracking an object.

FIG. 3 is a flow chart diagram 60 summarizing an example method of tracking an object 22 including estimating a heading angle using position information regarding one or more points A-D on the tracked object. At 62 the detector 44 detects radiation reflected from one or more points on the object 22 over time. A plurality of detections over time provides information regarding the object 22 as it moves. At 64, the processor 50 determines a position of each of the detections, which corresponds to the respective positions of the detected points A-D over time. In this example, the position information is determined in a world coordinate system.

At 66, the processor 50 determines a relationship between the positions determined at 64. The relationship in this example includes relative positions of the detections over an area that defines a shape. For example, the determined relationship defines an arc, line or rectangle that encompasses or includes the determined locations. The processor determines an orientation of that shape within the world coordinate system and uses that orientation to determine the estimated heading angle of the object at 68. The determination of the heading angle is therefore based on the relationship determined at 66.

In some situations, the orientation of the shape defined by the relationship determined at 66 will indicate a path of tracked object movement but not the direction of movement along that path. The processor 50 in this example uses range rate information regarding the plurality of detections to determine the direction of movement.

The processor 50 provides the determined estimated heading angle to the filter 46 at 70. The filter 46 will update a previous heading angle determined by the filter 46 based on the estimated heading angle from the processor 50. In some examples the filter 46 will replace the previously determined heading angle with the estimated heading angle from the processor 50.

Having sufficient detections over time allows the processor 50 to make more accurate estimations of the heading angle. In the example embodiment, the positions of the detections span a distance that exceeds a preselected threshold. Having a sufficiently large distance between the positions of the detections that are furthest apart increases the likelihood that the object 22 has moved sufficiently for the position information determined by the processor 50 to accurately estimate the heading angle. Given this description, those skilled in the art will be able to select an appropriate threshold distance to meet the needs of their particular situation.

The processor determines the estimated heading angle using one of several techniques. In one embodiment a likelihood estimation provides the most likely heading angle based on the positions of the detections.

Suppose there are N detections with positions $x=[x_1, \ldots, x_N]$ and $y=[y_1, \ldots, y_N]$ in a world coordinate system. The log-likelihood of detections $l(x,y|\theta)$ at a heading angle $\theta$ roughly describes how well the detection trace can fit a trajectory with a heading angle $\theta$. This embodiment includes an assumption that each detection has uniform position likelihood inside the object 22. Due to angle errors in the detections, the likelihood of a detection's position being outside the object 22 gradually decreases to zero as it gets further away from the object 22.

This example includes defining the object body coordinate system such that its longitudinal axis is parallel to the object heading angle 34, and its origin is the same as the origin of world coordinate. If an object track has a centroid $(x_t, y_t)$ in world coordinates, its centroid position in the object body coordinate system is $$\begin{bmatrix} p_t \\ o_t \end{bmatrix} = \begin{bmatrix} \cos\theta & \sin\theta \\ -\sin\theta & \cos\theta \end{bmatrix} \begin{bmatrix} x_t \\ y_t \end{bmatrix}.$$

The position of a detection $(x_i, y_i)$ in the object body coordinate system is $$\begin{bmatrix} p_i \\ o_i \end{bmatrix} = \begin{bmatrix} \cos\theta & \sin\theta \\ -\sin\theta & \cos\theta \end{bmatrix} \begin{bmatrix} x_i \\ y_i \end{bmatrix}, i = 1, \ldots, N.$$

The log-likelihood of a single detection $l(x_i,y_i|\theta)$ can be sufficiently represented by the orthogonal position of the detection relative to the object centroid, which can be represented as $$l(x_i,y_i|\theta)=h(o_i-o_t) \triangleq h(o_i').$$

Figure 4:
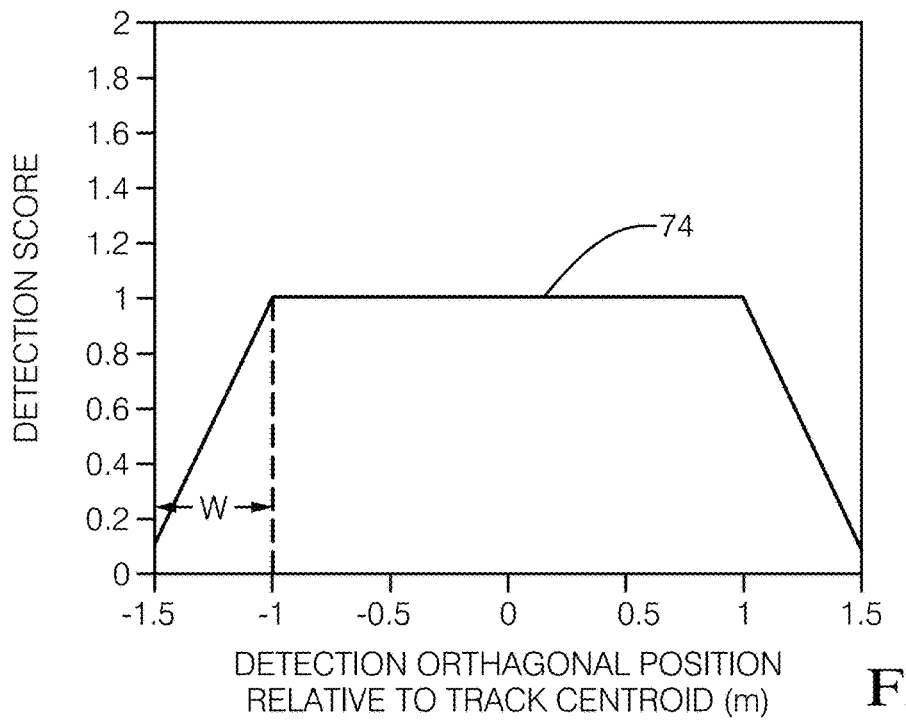
FIG. 4 graphically illustrates a log-likelihood function used in an example embodiment.

FIG. 4 shows an example of the log-likelihood of a detection as a function of $o_i'$. The width W of the taper regions on the left and right of the plot 74 can depend on the object pose, object range, and the nominal standard deviation of angle error in detections. It follows that $$W=W_{min}+|\cos\beta|(\max(r,r_{min})-r_{min})e$$

where, $\beta$ is the object heading angle relative to host vehicle 24, r is the object range, and e is the nominal standard deviation of angle error in the detections. The parameters $W_{min}$ and $r_{min}$ are pre-determined.

Assuming independence between multiple detections, the overall log-likelihood can be written as $$l(x,y|\theta)=\Sigma_{i=1}^N l(x_i,y_i|\theta)=\Sigma_{i=1}^N h(o_i').$$

The total likelihood is determined by the processor 50 in this example as the sum of individual likelihoods normalized by the number of detections. In one example embodiment, the total likelihood will take a low value if the longitudinal span of the shape determined from the relationship determined at 66 is less than the threshold distance. Detections close to the current object position are preferred over further detections to account for any maneuver of the object 22 at a longer distance. Additionally, when too few detections over time are available, the processor 50 assigns a low value to the total likelihood.

The maximum likelihood estimation of the heading angle can be obtained by solving:

$$\hat{\theta} = \arg\max_{\theta \in [0,2\pi]} l(x, y | \theta) = \arg\max_{\theta \in [0,2\pi]} \sum_{i=1}^{N} h(o_i').$$

That optimization equation cannot be analytically solved. For numerically solving such problem, an example embodiment includes a two-step angle search to find the optimal heading angle $\pi$. Note that it suffices to search inside $\theta \in [0,\pi]$, since the likelihood of detection at heading angles $\theta$ and $\theta+\pi$ are the same.

Figure 5:
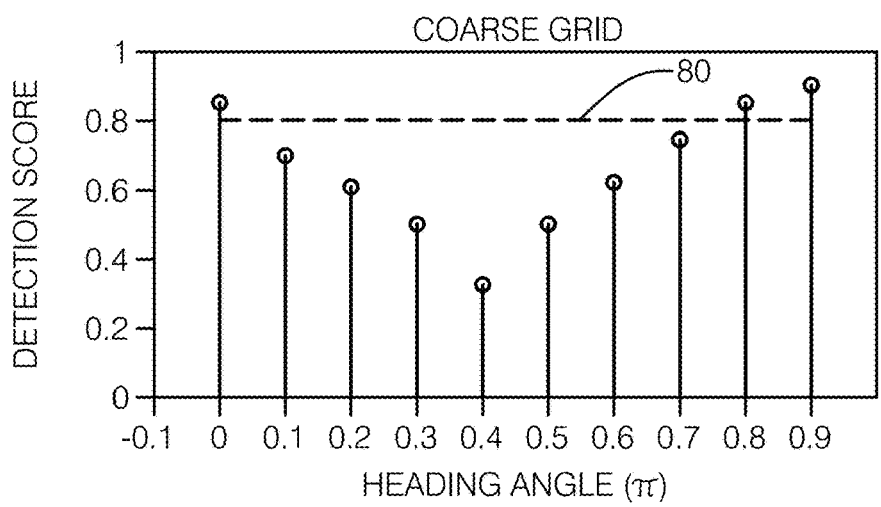
FIG. 5 graphically illustrates an angle grid used for determining an object heading angle in an example embodiment.
Figure 6:
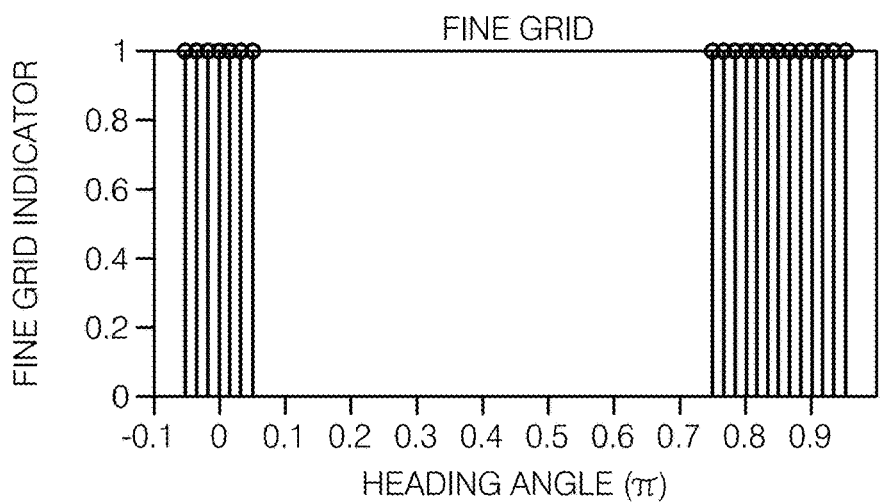
FIG. 6 illustrates another example angle grid that has finer resolution compared to the grid shown in FIG. 5.

The two-step angle search is demonstrated by FIGS. 5 and 6. The respective likelihoods of the detections are first evaluated on a coarse angle grid as shown in FIG. 5. If none of the likelihood exceeds a preselected threshold at 80, the processor 50 will stop the heading angle determination because of insufficient information in the detections. When at least one of the detections satisfies the threshold 80, the processor selects the angle points at which the likelihood is higher than the threshold 80 and establishes a fine angle grid covering the range of these angle points as shown in FIG. 6. Since the heading angles θ, 0.8 π and 0.9 π in FIG. 5 each exceed the threshold 80, the processor uses those angles as the angles of interest in the fine grid of FIG. 6. The resolution in FIG. 5 is π/10 and the resolution in FIG. 6 is π/60.

As can be appreciated from the illustration, a plurality of candidate angles surrounding the angles θ, 0.8 π and 0.9 π are evaluated by the processor 50. The optimal heading angle among those candidates that maximizes the likelihood is selected as the estimated heading angle π in this example.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A method, performed by a processor, of tracking a moving object proximate a host vehicle, the method comprising:
   receiving, from a ranging sensor of the host vehicle, a plurality of detections corresponding to multiple points on the moving object over time;
   determining a position of each of the detections relative to a two-dimensional world coordinate system; and
   determining an estimated heading angle of the moving object, the estimated heading angle defining a direction of motion of a centroid of the detections relative to the host vehicle, the estimated heading angle of the moving object determined by at least:
     for each of a plurality of candidate heading angles:
       defining an object body coordinate system for the detections, the object body coordinate system having a same origin as the two-dimensional world coordinate system and a longitudinal axis that is parallel to the respective candidate heading angle;
       for each of the detections, determining a log-likelihood for the respective detection based on the respective detection's orthogonal position relative to the centroid in the object body coordinate system for the respective candidate heading angle; and
       determining an overall log-likelihood for the respective candidate heading angle based on the log-likelihoods of the detections determined for the respective candidate heading angle; and
     selecting the estimated heading angle from the candidate heading angles based on the respective overall log-likelihoods for the candidate heading angles.

2. The method of claim 1, further comprising determining the positions of the detections the multiple points at least until a distance spanned by the determined positions exceeds a preselected threshold distance.

3. The method of claim 1, further comprising using the determined estimated heading angle to correct a previously estimated heading angle of the object.

4. The method of claim 3, wherein the previously estimated heading angle of the object is determined by a Kalman filter.

5. The method of claim 1, wherein the estimated heading angle is further determined by:
   selecting one or more coarse heading angles based on overall log-likelihoods for a plurality of candidate coarse heading angles;
   selecting a fine heading angle based on overall log-likelihoods for a plurality of candidate fine heading angles near the selected coarse heading angles,
   wherein the estimated heading angle comprises the fine heading angle.

6. The method of claim 5, wherein the selected coarse heading angles have log-likelihoods that exceed a preselected threshold.

7. The method of claim 1, wherein the overall log-likelihood for the respective candidate heading angle comprises a sum of the log-likelihoods of the detections determined for the respective candidate heading angle.

8. The method of claim 1, wherein selecting the estimated heading angle comprises selecting a candidate heading angle with a maximum overall log-likelihood.

9. The method of claim 1, wherein the estimated heading angle is further determined by:
   for each of the candidate heading angles, determining a total likelihood based on the log-likelihoods of the detections determined for the respective candidate heading angle; and
   selecting the estimated heading angle based on the total likelihood passing a threshold.

10. The method of claim 9, wherein the total likelihood comprises the overall log-likelihood normalized by a number of the detections.

11. A system configured to track a moving object proximate a host vehicle, the system comprising:
    a processor configured to:
      receive, from a ranging sensor of the host vehicle, a plurality of detections corresponding to multiple points on the moving object over time;
      determine a position of each of the detections relative to a two-dimensional world coordinate system; and
      determine an estimated heading angle of the moving object, the estimated heading angle defining a direction of motion of a centroid of the detections relative to the host vehicle, the estimated heading angle of the moving object determined by at least:
        for each of a plurality of candidate heading angles:
          defining an object body coordinate system for the detections, the object body coordinate system having a same origin as the two-dimensional world coordinate system and a longitudinal axis that is parallel to the respective candidate heading angle;
          for each of the detections, determining a log-likelihood for the respective detection based on the respective detection's orthogonal position relative to the centroid in the object body coordinate system for the respective candidate heading angle; and
          determining an overall log-likelihood for the respective candidate heading angle based on the log-likelihoods of the detections determined for the respective candidate heading angle; and
        selecting the estimated heading angle from the candidate heading angles based on the respective overall log-likelihoods for the candidate heading angles.

12. The system of claim 11, wherein the processor is further configured to detect the multiple points at least until a distance spanned by the determined positions exceeds a preselected threshold distance.

13. The system of claim 11, wherein the processor is further configured to use the determined estimated heading angle to correct a previously estimated heading angle of the object.

14. The system of claim 13, wherein the previously estimated heading angle of the object is determined by a Kalman filter.

15. The system of claim 11, wherein:
the processor is further configured to determine the estimated heading angle by:
selecting one or more coarse heading angles based on overall log-likelihoods for a plurality of candidate coarse heading angles; and
selecting a fine heading angle based on overall log-likelihoods for a plurality of candidate fine heading angles near the selected coarse heading angles; and
the estimated heading angle comprises the fine heading angle.

16. The system of claim 15, wherein the selected coarse heading angles have log-likelihoods that exceed a preselected threshold.

17. The system of claim 11, wherein the overall log-likelihood for the respective candidate heading angle comprises a sum of the log-likelihoods of the detections determined for the respective candidate heading angle.

18. The system of claim 11, wherein the selection of the estimated heading angle comprises a selection of a candidate heading angle with a maximum overall log-likelihood.

19. The system of claim 11, wherein the processor is further configured to determine the estimated heading angle by:
for each of the candidate heading angles, determining a total likelihood based on the log-likelihoods of the detections determined for the respective candidate heading angle; and
selecting the estimated heading angle based on the total likelihood passing a threshold.

20. The system of claim 19, wherein the total likelihood comprises the overall log-likelihood normalized by a number of the detections.

* * * * *